US012129605B2

(12) United States Patent
Brennan

(10) Patent No.: US 12,129,605 B2
(45) Date of Patent: Oct. 29, 2024

(54) APPARATUS AND METHOD FOR REPAIRING MATS

(71) Applicant: MatPro Services Corporation, Coraopolis, PA (US)

(72) Inventor: Richard John Brennan, Coraopolis, PA (US)

(73) Assignee: MatPro Services Corporation, Coraopolis, PA (US)

( * ) Notice: Subject to any disclaimer, the term of this patent is extended or adjusted under 35 U.S.C. 154(b) by 0 days.

(21) Appl. No.: 18/006,179

(22) PCT Filed: Jul. 25, 2022

(86) PCT No.: PCT/US2022/038229
§ 371 (c)(1),
(2) Date: Jan. 20, 2023

(87) PCT Pub. No.: WO2023/004198
PCT Pub. Date: Jan. 26, 2023

(65) Prior Publication Data
US 2024/0247448 A1     Jul. 25, 2024

Related U.S. Application Data

(60) Provisional application No. 63/230,119, filed on Aug. 6, 2021, provisional application No. 63/225,085, filed on Jul. 23, 2021.

(51) Int. Cl.
*E01C 11/00*    (2006.01)
*B29C 73/02*    (2006.01)
(Continued)

(52) U.S. Cl.
CPC .......... *E01C 11/005* (2013.01); *B29C 73/02* (2013.01); *B29C 2073/264* (2013.01); *B29C 2073/268* (2013.01); *B29L 2031/7324* (2013.01)

(58) Field of Classification Search
CPC ............................................... B29C 2073/264
See application file for complete search history.

(56) References Cited

U.S. PATENT DOCUMENTS

2003/0148058 A1* 8/2003 Brazier ................. B29C 41/383
                                                               428/156
2004/0005430 A1    1/2004 Rogers
(Continued)

FOREIGN PATENT DOCUMENTS

CH           629946 A  *  5/1982  ......... A47G 27/0212
DE        9313243 U1 * 12/1993  ............. A63C 19/00
(Continued)

OTHER PUBLICATIONS

Machine translation JP2001239209A (Year: 2001).*
(Continued)

*Primary Examiner* — Matthew J Daniels
*Assistant Examiner* — Wayne K. Swier
(74) *Attorney, Agent, or Firm* — The Webb Law Firm

(57) ABSTRACT

A method of repairing a mat including: cutting an irregular section of the mat to an approximately perpendicular edge; applying a sealant to the perpendicular edge; conjoining a secondary piece to the perpendicular edge; clamping the secondary piece to the perpendicular edge temporarily; and fixing the secondary piece to the perpendicular edge; where the mat being configured to support the weight of people, vehicles and equipment thereupon and undergo movement relative to one or more other mats without disengaging from another, and the mats include at least four sides and an edge extending along each side, the first and second sides of each mat having a lower lip extending horizontally outwardly below the edge thereof and the third and fourth sides of each (Continued)

mat having an upper lip forming the edge thereof, the respective upper and lower lips of different mats being interconnectable with pins.

13 Claims, 22 Drawing Sheets

(51) Int. Cl.
*B29C 73/26* (2006.01)
*B29L 31/00* (2006.01)

(56) References Cited

U.S. PATENT DOCUMENTS

2010/0209187 A1   8/2010   Relland et al.
2011/0142539 A1   6/2011   Sekine
2015/0099377 A1   4/2015   McDowell et al.
2020/0378593 A1   12/2020  Fuller

FOREIGN PATENT DOCUMENTS

| JP | 2001239209 A | * | 9/2001 | |
| TW | 399887 U | * | 3/2011 | .............. E04F 15/02 |
| TW | 201422881 A | * | 6/2014 | |

OTHER PUBLICATIONS

Machine translation TW201422881A (Year: 2014).*
Machine translation CH629946A5 (Year: 1982).*
Machine translation DE9313243U1 (Year: 1993).*
Machine translation TWM399887U (Year: 2011).*
"Megadeck Product Specifications", New South Access & Environmental Solutions, 2021, pp. 1-2.

* cited by examiner

APPARATUS AND METHOD FOR REPAIRING MATS

CROSS REFERENCE TO RELATED APPLICATIONS

This application is the United States national phase of International Application No. PCT/US2022/038229 filed on Jul. 25, 2022, and claims priority to U.S. Provisional Patent Application No. 63/225,085 filed on Jul. 23, 2021 and U.S. Provisional Patent Application No. 63/230,119 filed on Aug. 6, 2021, the disclosures of which are hereby incorporated by reference in their entirety.

BACKGROUND OF THE INVENTION

Field of the Invention

The invention relates to the repair of a modular flooring and roadway system.

More particularly, the invention relates to the repair of modular floor mats which provide increased strength, stability, and protection of the subsurface in heavy industrial applications.

Description of Related Art

Heavy duty modular flooring systems of various designs have been utilized for a significant period of time to provide a temporary and rigid surface in remote or inaccessible areas. More particularly, such systems are primarily utilized in settings where a firm and stable surface is temporarily needed, such as industrial or construction areas. With respect to industrial or construction areas, temporary flooring may be utilized to provide walkways, driveways, parking areas or other rigid surfaces for the transport of materials, vehicles, storage, or mounting of equipment.

The modular nature of such flooring is utilized to adapt the flooring to the particular topographic or geographic needs of the particular site and to also allow for the efficient storage and transport of the modular flooring.

An example floor mat used is the DURA-BASE® mat by Newpark Resources Inc. The mat is formed of two overlapping rectangular sections with a honey-comb internal design. Holes extend around the perimeter of the mat along the non-overlapping portions of the two sections. When two of these mats are placed next to each other, the mats overlap and the holes along the common edge of these two mats line up such that a temporary locking pin can be placed through the holes of both mats to secure the two mats together. Given their shape and size, handling, placing, and removal of these mats has proved difficult. Due to the design of the perimeter of the mats, a decrease in durability occurs on the edges.

An example floor mat used is the MEGADECK® mat by Signature Systems. The mat is formed of two overlapping rectangular sections. Holes, having an attachment device, extend around the perimeter of the mat along the non-overlapping portions of the two sections. When two of these mats are placed next to each other, the mats overlap and the holes or attachment devices along the common edge of these two mats line up, such that a temporary locking pin can be placed through the holes or attachment devices of both mats to secure the two mats together. Such locking pins or devices are prone to failures that create a need for an improved connection apparatus.

Locking pins include a self-aligning locking mechanism that connect the overlapping flange of the mats. The connection includes a key or device to twist and lock the components. Such pins are made of cast aluminum. However, such pins commonly break or breaks occur to areas of the mats surrounding the pins. The pins also commonly detach and no longer connect the mats properly. Mats are commonly made up of a composite, thermoplastic, or similar material with varying flexibility. The locking pins, commonly made of an aluminum, steel, or metallic material have much less flexibility. This causes the connection between the floor mats and the locking pins to fail and detach when a heavy load or force is applied to the floor mats near the locking pin or attachment device location. The floor mat is able to flex or bend while the locking pin does not. This causes breaks in or around the hole locations under stress or heavy loading. Any successful fastening device must provide substantial holding strength to secure the mats and prevent separation. Particularly, when mats are used in roadway surfaces, extreme pressures are placed on the adjoining mats and on the locking mechanism.

In operation, the selection of the particular floor mat and its characteristics are primarily based upon the amount of load expected to be exerted on the modular flooring system, as well as the relative support characteristics of the underlying substrate, be it concrete, artificial turf, grass, dirt, or the like. Heavy construction applications commonly cause cracking and breaking, especially on the edges or sides of the flooring mats. Such breaks and damage render the modular floor mat unusable. Replacing a modular flooring mat is time consuming and expensive.

One method of repair, which has been used, includes removing the damaged section of the flooring mat to create sharp angles. Then adding a new section of flooring mat which has been shaped to fit in the removed space. The use of pegs or attachment points is then used to secure the added section of flooring mat. While this method is currently used, there are a number of issues and flaws which inhibit this solution: the added new section remains a weak point which will break with ease under common heavy construction applications; the attachment points are fragile and prone to breakage; and there is no seal between the added new section and the flooring mat allowing fluids and debris to penetrate. Therefore, there is a need for an improved repair method.

Additionally, the time and cost of replacing a flooring mat interferes with the construction project as a whole. While a flooring mat is being replaced, the area is unusable. Therefore, there is a need for an improved, quick on site repairing method.

Another method of repair is to add smaller flooring mats to cover up the broken area of the flooring mat. This solution also has a number of issues, such as an increased cost of purchasing additional flooring mats and increased waste because the broken sections must be disposed of.

Another common problem is the mats top layer detaches from the main body of the mat. This exposes the internals of the mat rendering the mat useless and vulnerable to more damage. Thus, there is a need for an improved attachment means of the top layer to the body or bottom layer of the mats.

The present invention relates to an improved method for repairing the flooring mats on site.

SUMMARY OF THE INVENTION

In many embodiments, the present invention involves a method of repairing a floor mat, comprising: cutting an irregular section of the floor mat to an approximately perpendicular edge; cutting a surface of an irregular open section of the floor mat to an approximately flat or square edge; applying a filler to the open section; applying a sealant to the perpendicular edge and approximately flat edge; conjoining a secondary piece to the perpendicular edge, wherein the secondary piece covers the open section; clamping the secondary piece to the perpendicular edge temporarily; clamping the open section to the flat edge temporarily; fixing the secondary piece to the perpendicular edge; and fixing the open section to the perpendicular edge such that the secondary piece covers the open section; wherein the floor mat being configured to support the weight of people, vehicles and equipment thereupon and undergo movement relative to one or more other floor mats without disengaging from another, and the floor mats comprise at least four sides and an edge extending along each side, the first and second sides of each mat having a lower lip extending horizontally outwardly below the edge thereof and the third and fourth sides of each mat having an upper lip forming the edge thereof, the respective upper and lower lips of different mats being interconnectable with locking pins releasably securable through corresponding apertures formed therein and wherein the secondary piece is fixedly attached to the floor mat to repair the floor mat.

In an embodiment, the method of repairing a floor mat further comprises: drilling holes into the perpendicular aperture edge; drilling holes into a secondary aperture piece; and inserting bars into the holes of the secondary aperture piece and perpendicular aperture edge.

In an embodiment, the method of repairing a floor mat further comprises: clamping the secondary piece to the perpendicular edge via an engagement aperture.

In an embodiment, the method of repairing a floor mat further comprises: drilling the holes such that the hole tunnels through at least a minor portion of the floor mat.

In an embodiment, the method of repairing a floor mat further comprises: applying the sealant to the holes prior to inserting the bars.

In an embodiment, the method of repairing a floor mat further comprises: applying the sealant to the filler, wherein the filler is a solid material.

In an embodiment, the method of repairing a floor mat further comprises: applying the sealant to the filler, wherein the filler is a liquid material.

In many embodiments, the present invention involves a method of repairing an attachment piece of a floor mat, comprising: preparing a locking center and a washer for installation; preparing a hole to receive the locking center; installing the locking center in the hole; forming attachment points through the mat; and using pins through the attachment points to fixedly attach the locking center and washer to the mat; wherein the floor mat being configured to support the weight of people, vehicles and equipment thereupon and undergo movement relative to one or more other floor mats without disengaging from another, and the floor mats comprise at least four sides and an edge extending along each side, the first and second sides of each mat having a lower lip extending horizontally outwardly below the edge thereof and the third and fourth sides of each mat having an upper lip forming the edge thereof, the respective upper and lower lips of different mats being interconnectable with locking pins releasably securable through corresponding apertures formed therein and wherein the secondary piece is fixedly attached to the floor mat to repair the floor mat.

In an embodiment, the method of repairing a floor mat further comprises: grinding the washer and pins to be flush with the mat.

In an embodiment, the method of repairing a floor mat further comprises: applying a plastic weld over the washer to seal over the washer.

In an embodiment, the method of repairing a floor mat further comprises: grinding the plastic weld to be flush with the mat.

In an embodiment, the method of repairing a floor mat further comprises: drilling a hole through a top surface of the mat; inserting a fastener into the hole to secure the top surface to the bottom surface of the mat.

In an embodiment, the method of repairing a floor mat further comprises: releasably securing the floor mat to a second floor mat through corresponding apertures formed therein.

In an embodiment, the method of repairing a floor mat further comprises: applying the plastic weld to the lower lip extending horizontally outwardly below the edge.

In many embodiments, the present invention involves a repaired floor mat, comprising: a floor mat; at least one bar; and at least one secondary piece fixedly attached to the floor mat with an adhesive; wherein the floor mat being configured to support the weight of people, vehicles and equipment thereupon and undergo movement relative to one or more other floor mats without disengaging from another, and the floor mats comprise at least four sides and an edge extending along each side, the first and second sides of each mat having a lower lip extending horizontally outwardly below the edge thereof and the third and fourth sides of each mat having an upper lip forming the edge thereof, the respective upper and lower lips of different mats being interconnectable with locking pins releasably securable through corresponding apertures formed therein and wherein the secondary piece is fixedly attached to the floor mat to repair the floor mat.

In an embodiment, the repaired floor mat comprises a locking device fixedly attached to the aperture being interconnectable with locking pins; the locking device comprising a lock frame surrounded by a washer.

In an embodiment, the repaired floor mat comprises the washer surrounds the aperture and is fixedly attached to the mat around the aperture with an adhesive.

In an embodiment, the repaired floor mat comprises the locking device comprising the lock frame is configured to engage and lock with a rotatable pin and a body shaped to securely fit in the aperture.

In an embodiment, the repaired floor mat comprises the at least one bar may be at least as long as the side of each mat.

In an embodiment, the repaired floor mat comprises the adhesive may be applied to the at least one bar and the at least one bar may be inserted into a section of the floor mat and the secondary piece.

Accordingly, the present invention includes features and advantages which are believed to enable it to advance repair load-support surface technology. Characteristics and advantages of the present invention described above and additional features and benefits will be readily apparent to those skilled in the art upon consideration of the following detailed description of various embodiments and referring to the accompanying drawings.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DESCRIPTION OF THE INVENTION

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items.

Unless specified or limited otherwise, the terms "mounted", "connected", "supported", and "coupled" and variations thereof, are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation such as, terms like "central", "upper", "lower", "front", "rear", etc. are only used to simplify description of embodiments of the present invention and do not alone indicate or imply that the device or element referred to must have a particular orientation. In addition, terms such as "first" and "second" are used herein for purposes of description and are not intended to indicate or imply relative importance or significance.

Figure 1:
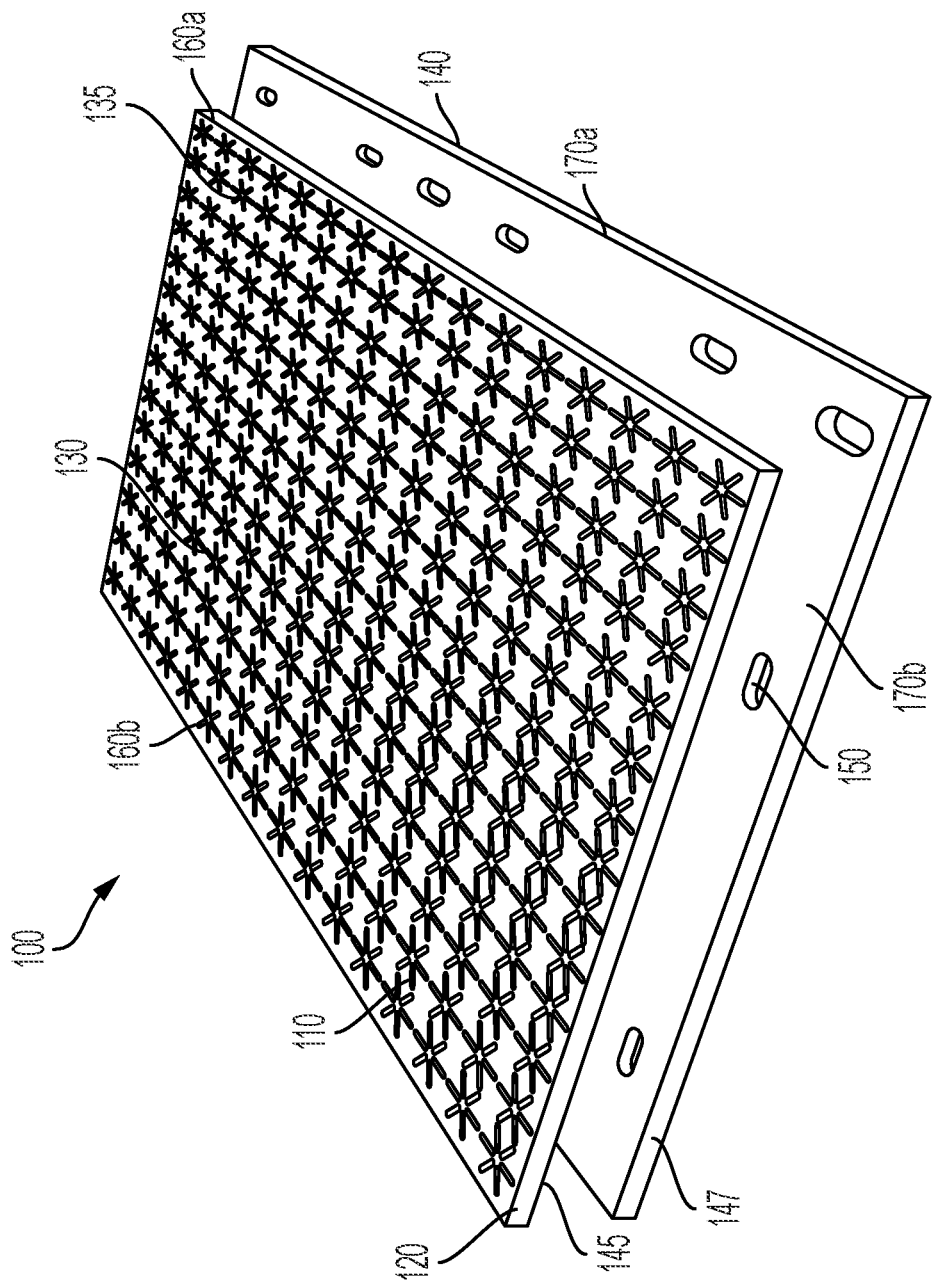
FIG. 1 is an isometric view of a flooring mat.

Referring initially to FIG. 1, an exemplary floor mat 100 is comprised of a main body 110 and edges 120. The floor mat 100 has a top surface 130 and a bottom surface 140. The top surface 130 is designed to contact heavy machinery and support commercial construction sites. Examples of the floor mat 100 include the DURA-BASE® mat by Newpark Resources Inc. The floor mat 100 may be made of high-performance thermoplastics, high density polyurethane, or similar material. The internal structure of the mat 100 may be a honey-comb design, common in the structure of such mats 100. Floor mat 100 may have engagement apertures 150 for transportation and connection means. The engagement apertures 150 allow for access through the floor mat 100 and attachment to additional floor mats 100. The floor mat 100 may have angled or additional edges 120 for attachment means. The mats 100 can be attached together to form a load bearing site to make a stable ground or flooring for construction equipment.

Referring to FIG. 1, the preferred embodiment of the floor mat 100 of the present invention comprises a plurality of uniform mats having upper section 130 and lower section 140. Upper section 130 has upper work surface 135, while lower section 140 has lower work surface 145. Although upper work surface 135 and lower work surface 145 are depicted as being substantially smooth, minor indentations or raised portions may be added to said work surfaces to increase traction characteristics. Such indentations or raised portions aid in forming a non-slip work surface. Upper section 130 and lower section 140 are mutually offset relative to each other, which results in upper peripheral extension 145 and lower peripheral extension 147. In the preferred embodiment, outer edges of upper section 130 and lower section 140 are beveled along the full extent of said edges.

Further an upper section 130 and lower section 140, as well as upper peripheral extensions 160*a* and 160*b* and lower peripheral extension 170*a* and 170*b* are present. When two mats of the preferred embodiment are laterally placed together for purposes of constructing a roadway or other support surface, lower peripheral extension 170*a* is received under upper peripheral extension 160*a* of an adjacent mat. Similarly, when two mats are placed together in longitudinal fashion, lower peripheral extension 170*b* is received under upper peripheral extension 160*b*.

When a plurality of floor mats 100 are joined together, the floor mats 100 form a continuous and substantially smooth roadway or other support surface. Further, the overlap/underlap relationship shared by adjacent floor mats 100 provides strength for load support purposes. Additionally, the overlap/underlap relationship also provides increased friction contact between mats to prevent separation of the floor mats 100 in tandem with the locking pins through apertures 150. The engagement apertures 150 allow for access through the floor mat 100 and attachment to additional floor mats 100. The floor mat 100 may have angled or additional edges 120 for attachment means. The engagement apertures 150 of one floor mat 100 align with the engagement apertures 150 of another floor mat 100 to allow for removable coupling between the floor mats 100.

Although it is possible that the floor mats 100 can be constructed of solid material, in the preferred embodiment said mats are comprised of two mirror-image components which are affixed together to form a single mat. FIGS. 1-10 depict lower section 140, having area of reduced material 320. While an area of reduced material 320 is depicted as a row configuration in FIG. 3, it is possible that the area could have any number of configurations. Beveled ridge walls 325 extend along the inner edges of the area of reduced material 320. Lower peripheral extension 170a and 170b are constructed of solid material.

In the preferred embodiment, lower section 140 is joined with and affixed to a mirror-image section. The sections are oriented such that area of reduced material 320 is aligned with the area of reduced material of the upper mirror-image section, and so that only these sections of reduced material overlap. This orientation results in forming lower peripheral extensions 170a and 170b. Similarly, the solid edges of the mirror-image section form upper peripheral extensions 160a and 160b.

Figure 2:
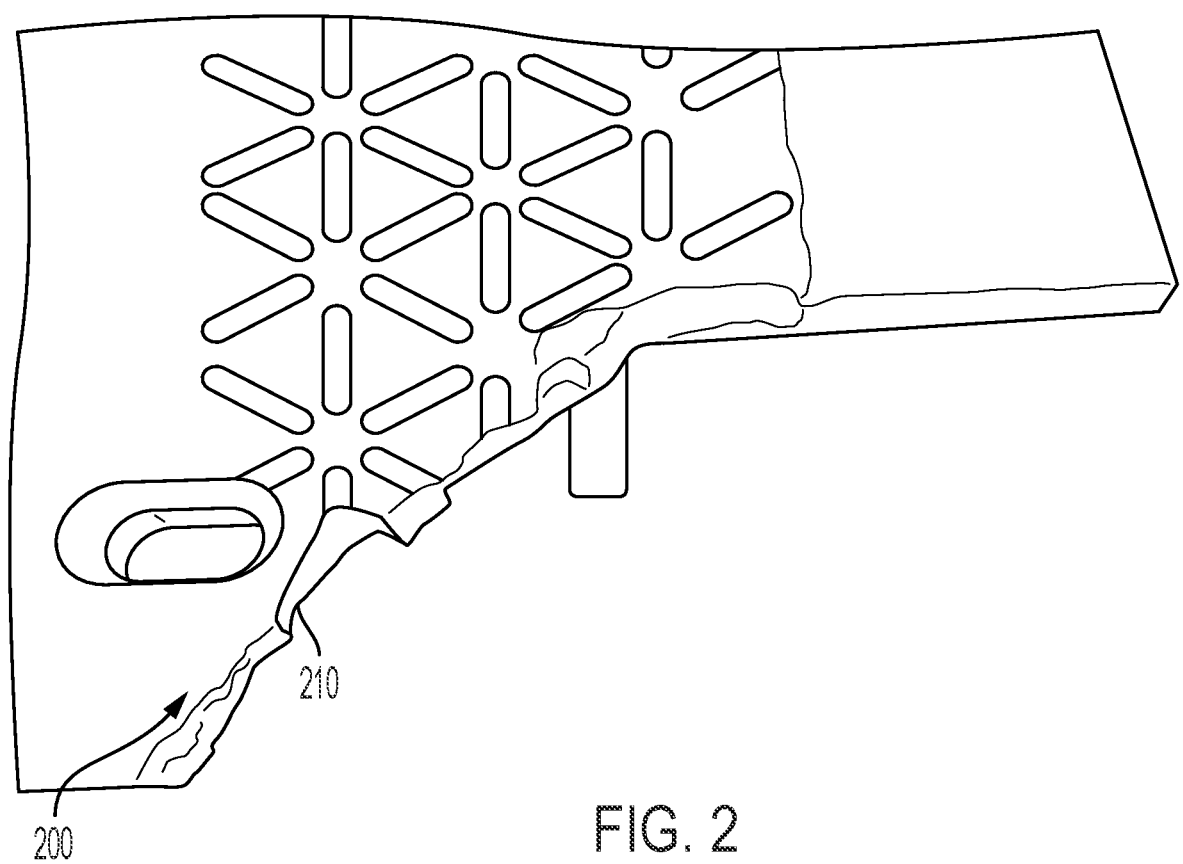
FIG. 2 is a top down view of the flooring mat with a broken piece.

As illustrated in FIG. 2, the floor mat 100, when damaged, may include a broken section 200 including a broken edge 210. The broken edge 210 may be rough and topographical. The broken edge 210 may be formed on an uneven section of the top surface 130 or bottom surface 140. The broken edge 210 may include a portion of the engagement apertures 150, not shown. The broken edge 210 may include rough or jagged edges common when thermoplastics are damaged or broken by force. Such breaks are common in the construction industry as floor mats 100 undergo various stresses and forces. The broken edge 210 may be such that the top surface 130 or bottom surface 140 extends further than the other.

Figure 3:
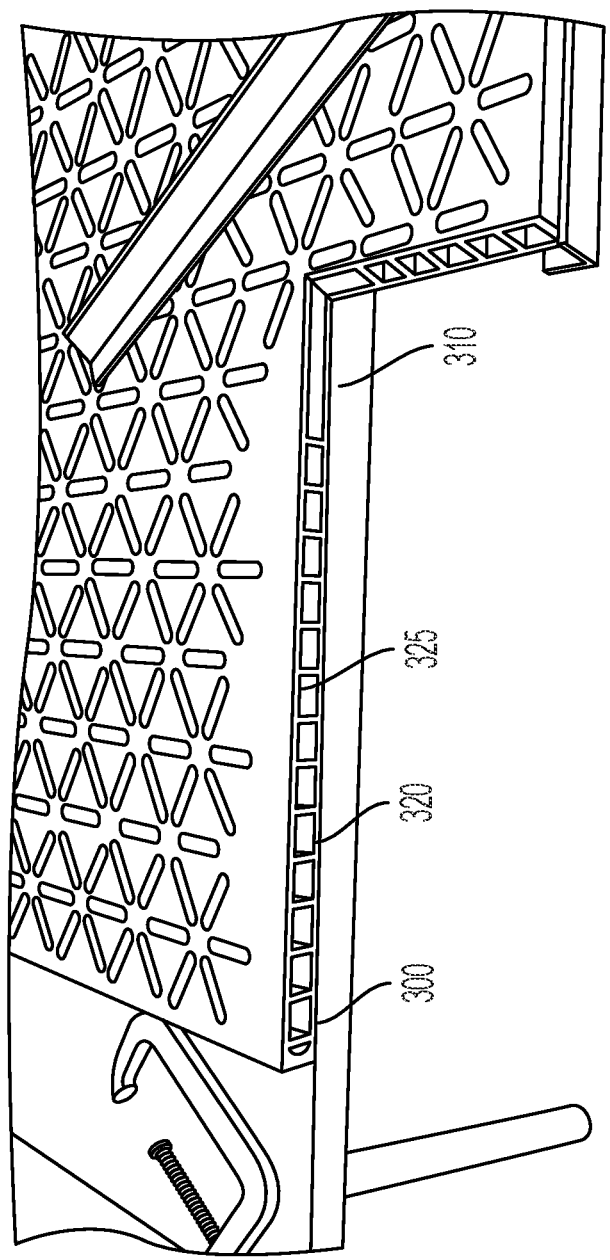
FIG. 3 is a top isometric view of the flooring mat with a squared broken edge.

As illustrated in FIG. 3, the broken section 200 of the floor mat 100 may be cut to create a squared edge 300. The squared edge 300 may be cut to approximately create a perpendicular, flat surface 310. The flat surface 310 is arranged to be easily connectable to repair the floor mat 100. The flat surface 310 may be arranged at approximately a 90 degree angle to the top surface 130 or bottom surface 140 or arranged so that an even surface is present. The internal beveled ridge walls 325 are exposed with the squared edge 300. The lower peripheral extension 170a and 170b are exposed with the square edge 300. The squared edge 300 may be cut to approximately create a saw-toothed or step-like surface. The squared edge 300 is advantageously cut to aid in connecting a new piece of mat.

Figure 4:
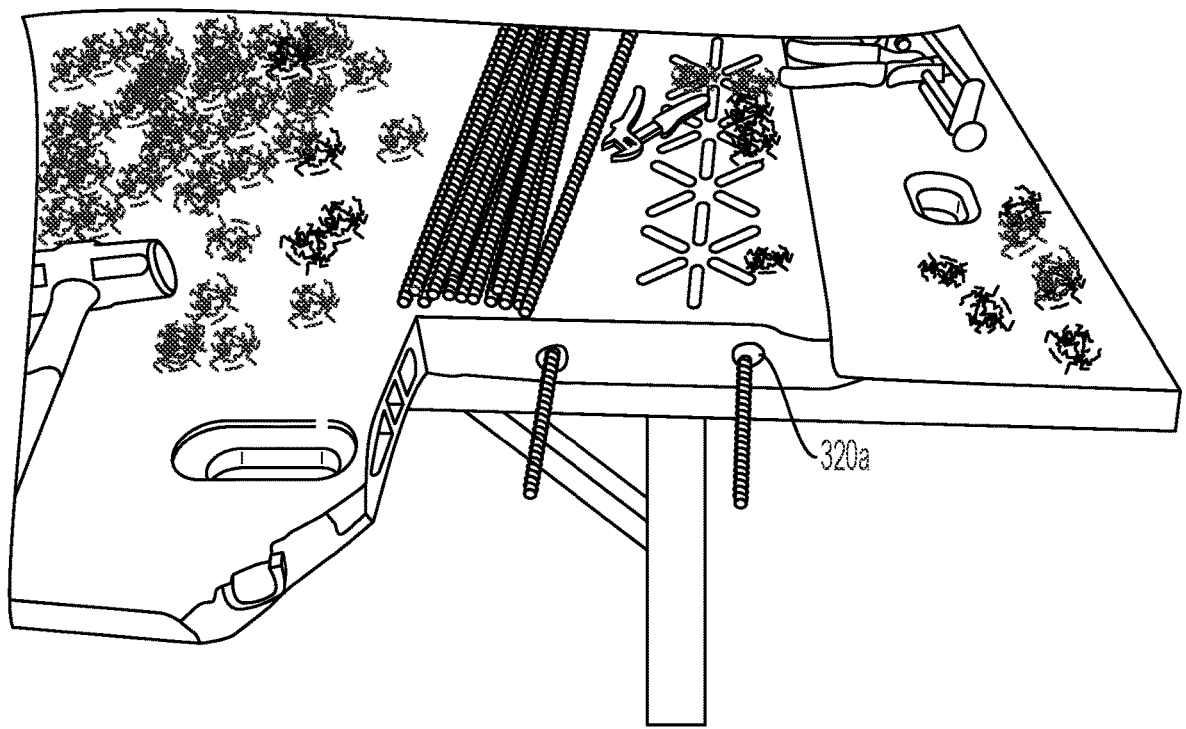
FIG. 4 is a top isometric view of the bars installed in the squared broken edge.
Figure 5:
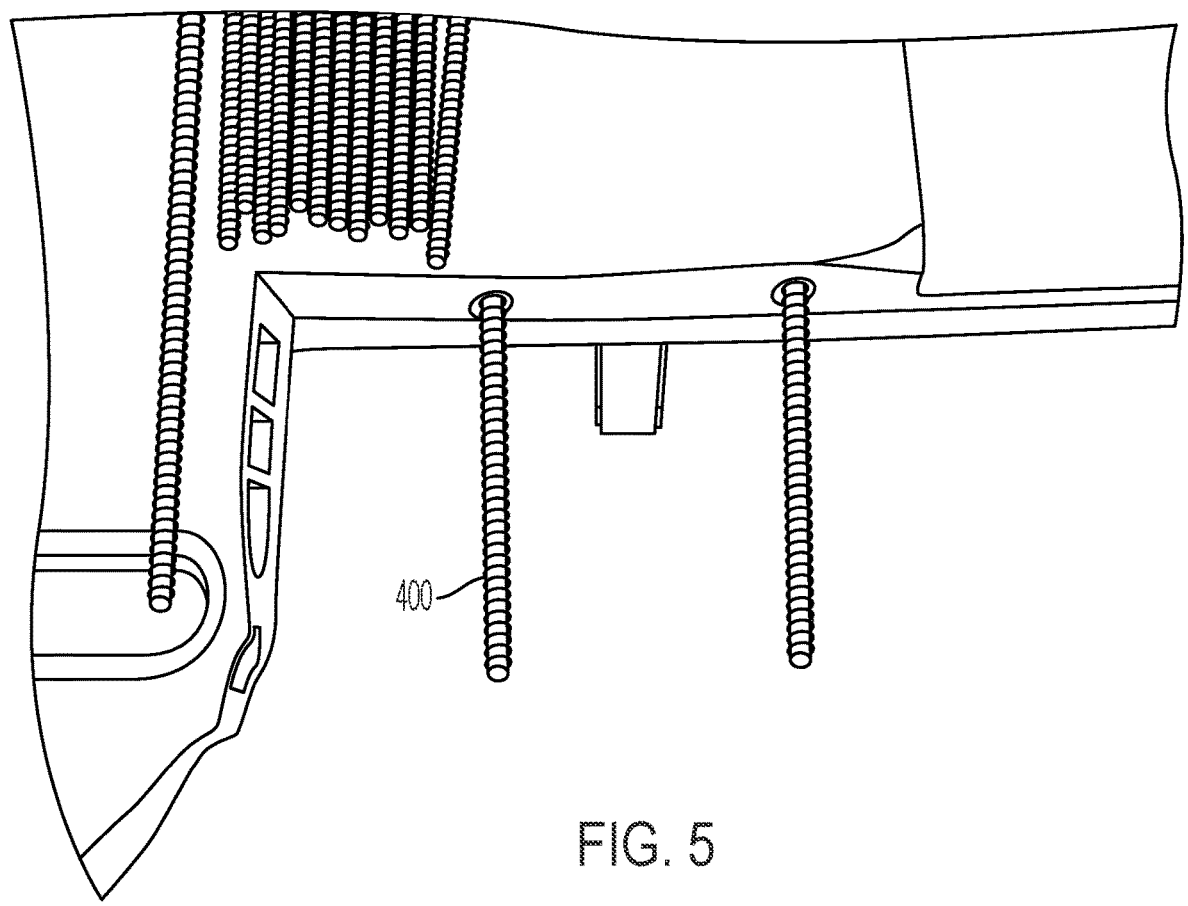
FIG. 5 is a top view of the bars installed in the square broken edge.

As illustrated in FIGS. 4 and 5, the flat surface 310 may include holes 320a. Holes 320a may be drilled, dug, or created by another means. Holes 320a are at least large enough in diameter to fit a rebar wire or a similar support means. Holes 320a are at least long enough in depth so a rebar wire may be placed to create a support for secure attachment of a repair method. There may be multiple holes 320a, dependent upon the size of the broken section 200. An increased size of the broken section 200 increases the number of the holes 320a. Holes 320a are preferably spaced approximately eight inches apart, but may be spaced more or less. Holes 320a are drilled to be parallel to one another, but may be angled as well. Holes 320a may be approximately perpendicular to the internal beveled ridge walls 325. The Holes 320a are advantageously located to allow for bars 400 to be inserted to aid in support of the floor mat 100 and for any structure to be added.

Bars 400 are placed in holes 320a along flat surface 310. Bars 400 are rebar or a similar material. Bars 400 may be approximately straight or angled. Bars 400 extend out of holes 320a at an approximately perpendicular angle to flat surface 310. Bars 400 extend out to a user specified distance to provide support for future attachments. Bars 400 may be secured in holes 320a with a sealant 500. Bars 400 may also be placed between the beveled ridge walls 325 and extend along the inner edges of the area of reduced material 320. The sealant 500 may be injected into the beveled ridge walls 325 and extend along the inner edges of the area of reduced material 320 to secure the bars 400.

Figure 6:
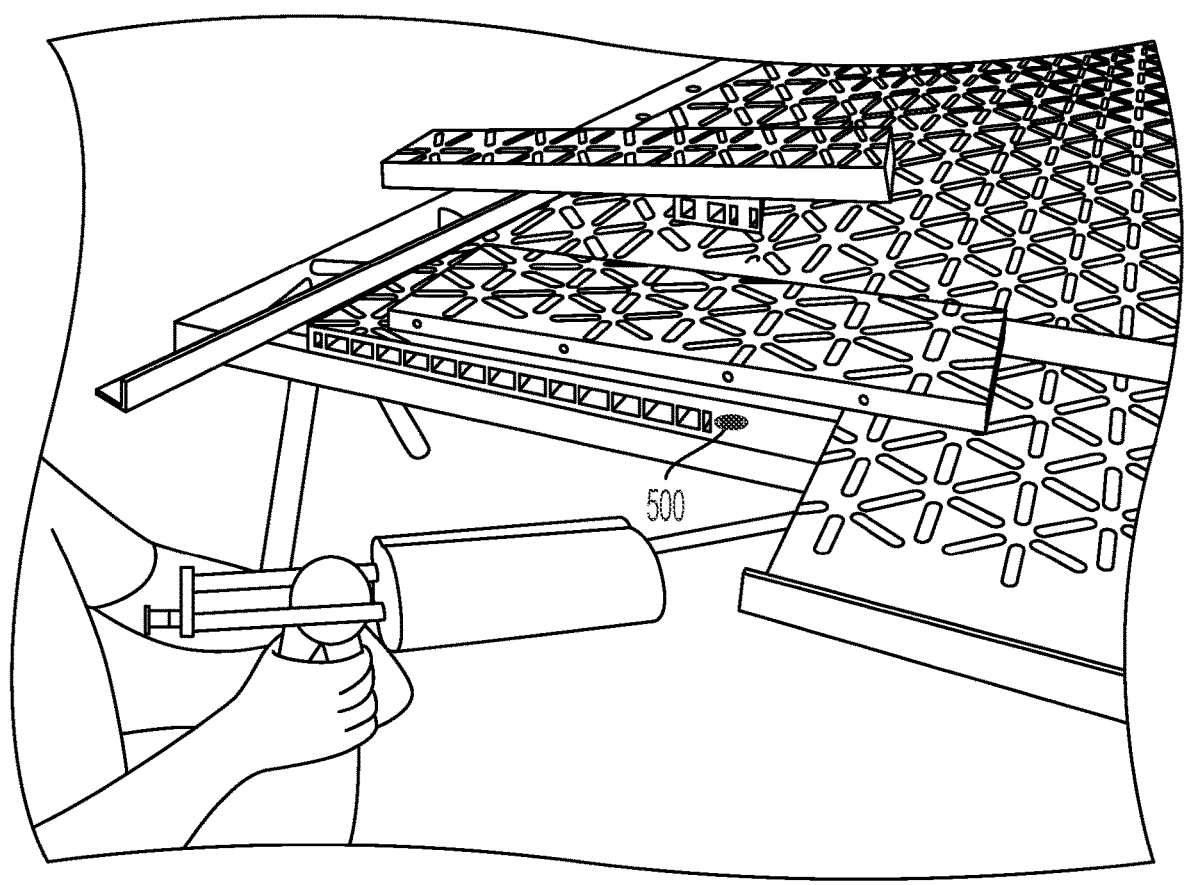
FIG. 6 is an isometric view of a sealant being applied to the square broken edge.
Figure 7:
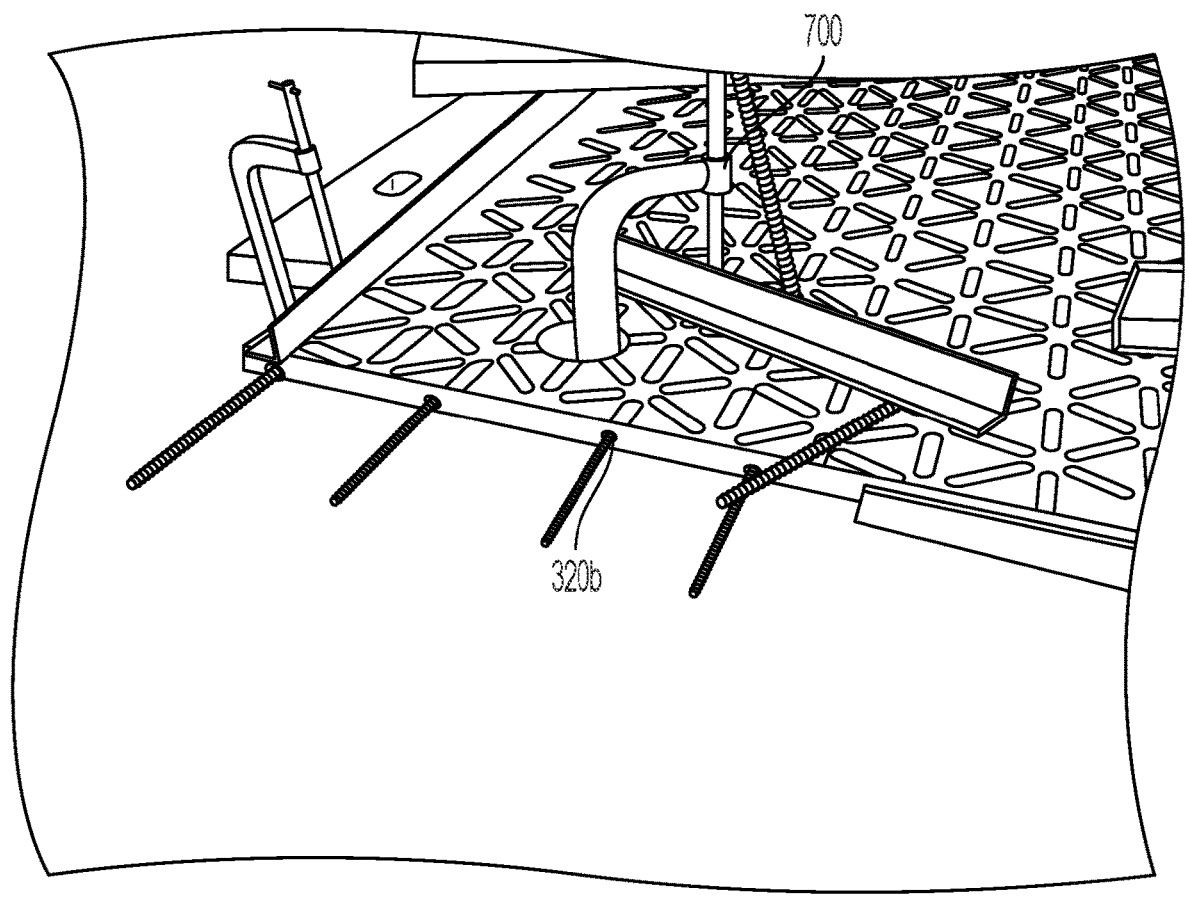
FIG. 7 is an isometric view of a new piece coupled to the square broken edge with the bars exposed and clamps.

As illustrated in FIG. 6, the sealant 500 is applied to the holes 320a. The sealant 500 may be applied to partially or fully coat the internals of the holes 320a. The sealant 500 may be a polymer, concrete epoxy, or any material capable of sealing. The sealant 500 may also be applied to flat surface 310 of the squared edge 300 to aid in attaching. The sealant 500 may be applied to partially or fully coat the flat surface 310. The sealant 500 is applied to fixedly attach the bars 400 to the holes 320a and aid in fixedly attaching a new piece 600 to the flat surface 310.

The new piece 600, or secondary piece, is attached to the squared edge 300. The new piece 600 may be made of a similar thermoplastic or material like the floor mat 100. The new piece 600 is attached using the bars 400 and sealant 500. The new piece 600 is shaped to fit approximately seamlessly with the floor mat 100 after the squared edge 300 is cut. An outer edge 610 of the new piece 600 aligns with the outer edge of the floor mat 100. The new piece 600 may have holes 320b which line up with holes 320a and allow for entrance of the bars 400. When new piece 600 is attached with the sealant 500, a liquid proof seal is made. This seal prevents liquid or debris from passing in-between the new piece 600 and floor mat 100, while attaching the new piece 600 to the squared edge 300. The new piece 600 advantageously increases the surface area of the mat 100 to its original unbroken form.

As illustrated in FIGS. 7-10, clamps 700 and other gripping member means may be used to secure the new piece 600 to the floor mat 100 while the sealant 500 is drying or solidifying. The clamps 700 are used to maintain an approximate level surface between the new piece 600 and the floor mat 100 while the sealant 500 is drying or solidifying. Clamps 700 may extend through the engagement apertures 150 to further secure the new piece 600 to the floor mat 100. Clamps 700 are removed once the sealant 500 is sufficiently solidified. Various clamps 700 may be used in any amount to secure the new piece 600 and the floor mat 100.

Figure 8:
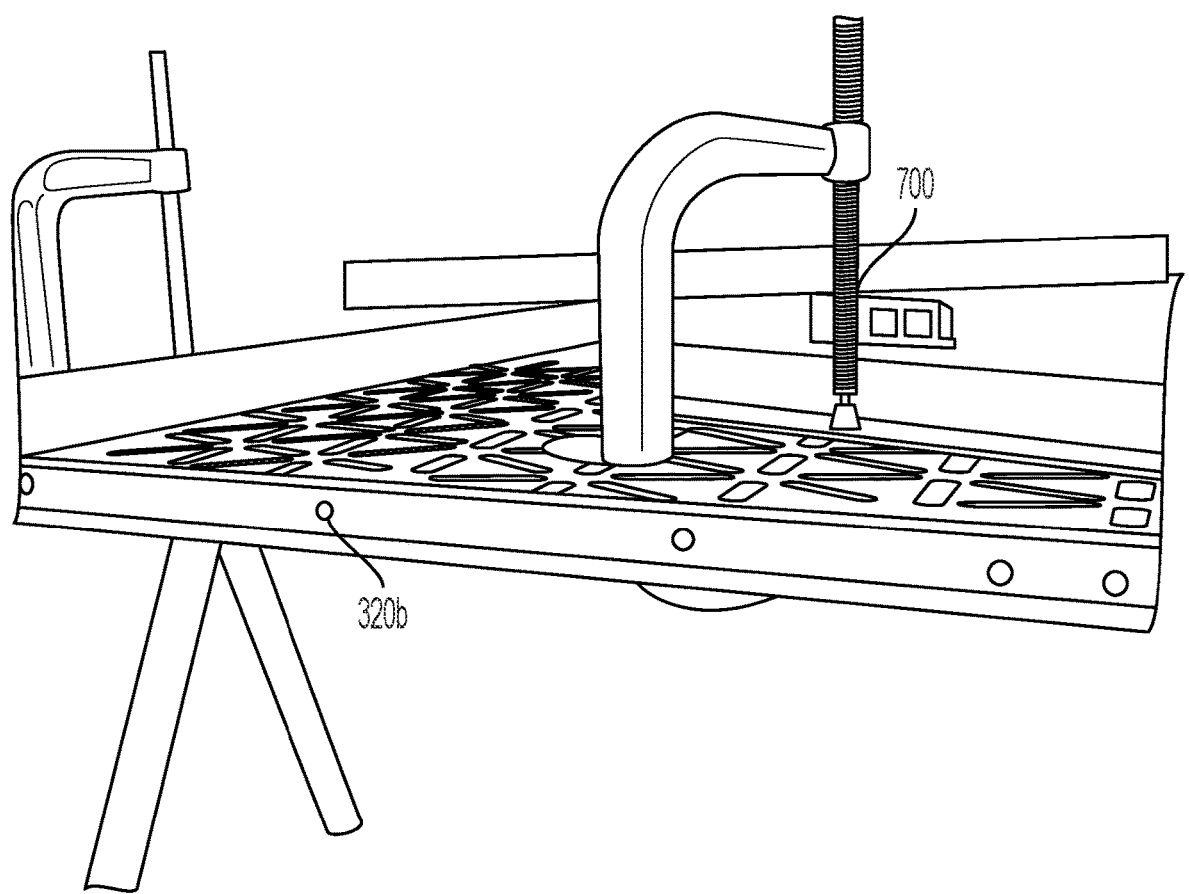
FIG. 8 is another view of the new piece coupled to the square broken edge with clamps.
Figure 9:
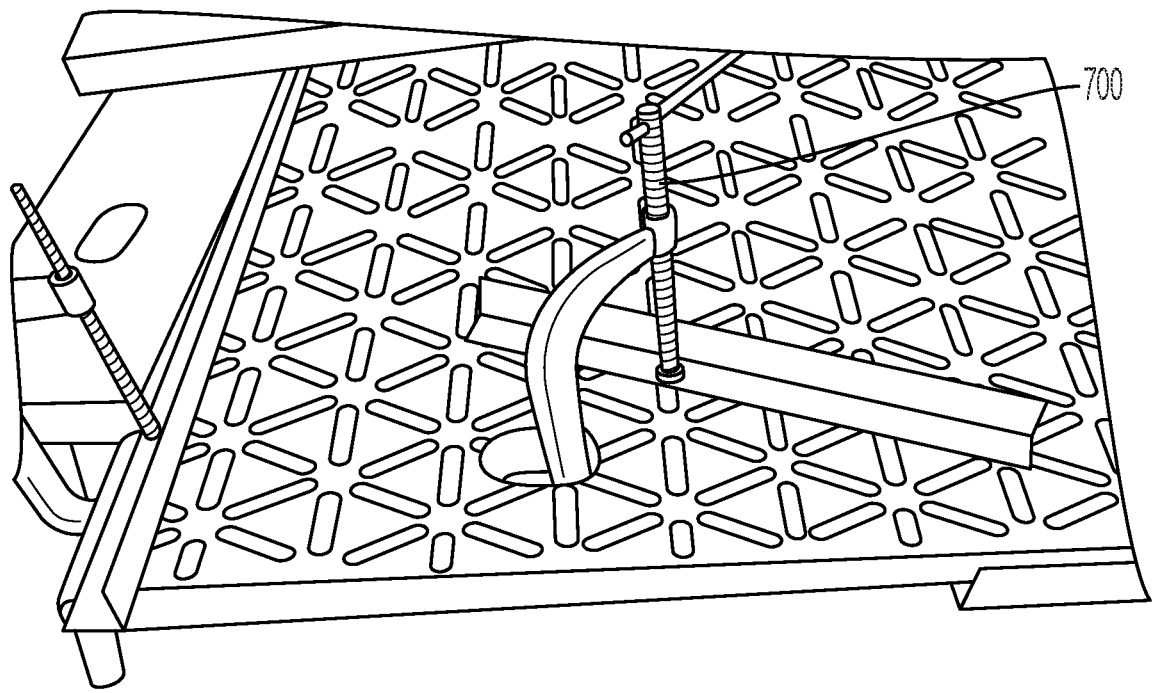
FIG. 9 is another view of the new piece coupled to the square broken edge with clamps.
Figure 10:
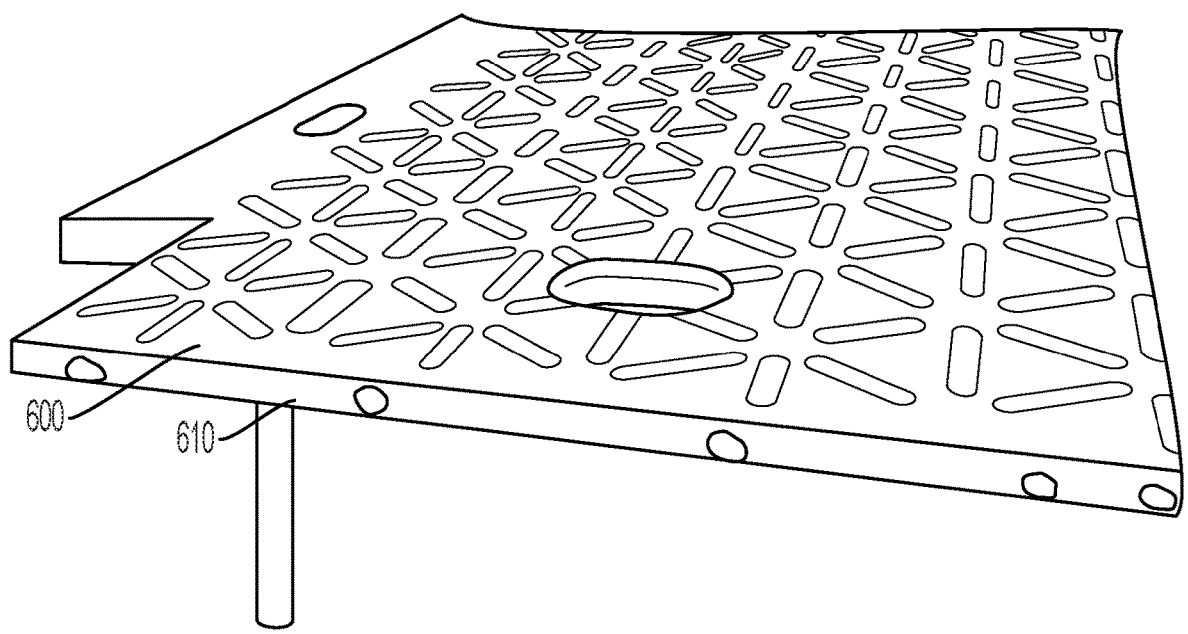
FIG. 10 is an isometric view of the new piece coupled to the square broken edge.

As illustrated in FIG. 8, bars 400 may extend through the new piece 600. This is to ensure there is proper support throughout the new piece 600. Bars 400 are inserted through holes 320a, 320b. If the bars 400 are exposed, bars 400 are then altered or cut to be approximately even or flush with the outer edge of the new piece 600. Bars 400 may extend all the way along the floor mat 100 or partially. The bars 400 may be spaced out to properly support the new piece 600 with the floor mat 100.

To create the seal, the outer edge 610 of the new piece 600 and the outer edge of the floor mat 100 are altered to better adhere with the sealant 500. The outer edge 610 may be ground down to expose an inner surface of the new piece 600. The outer edge 610 of the floor mat 100 may be ground down to expose an inner surface of the floor mat 100. Sealant 500 may then be applied to the exposed surfaces. A plastic weld may also be applied to the exposed surfaces. After the sealant 500 or the plastic weld is dried or solidified, another grinding process may occur to smooth out the dried area and create a flush surface with the dried area and the outer edge 610.

Figure 11:
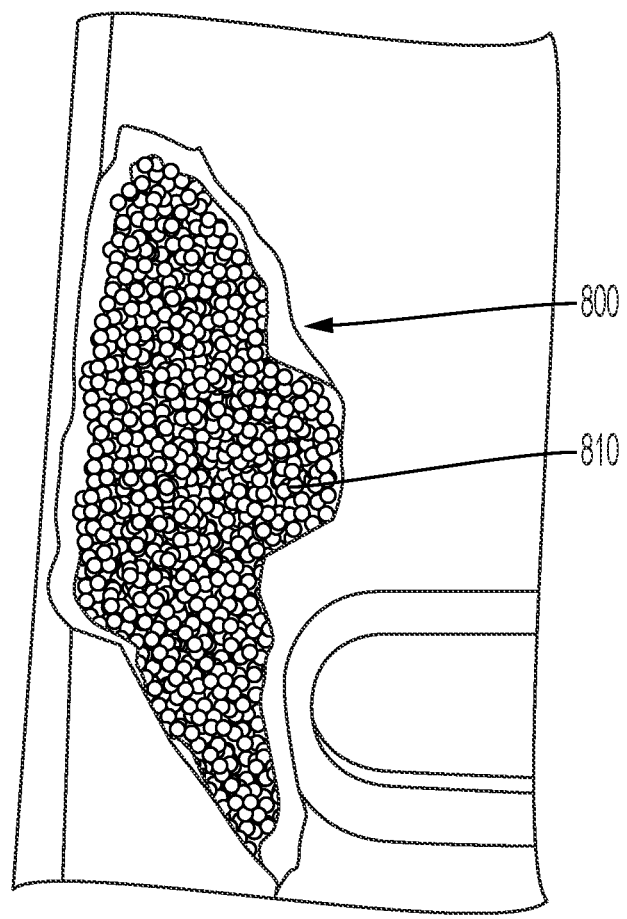
FIG. 11 is a perspective view of an alternative step with filler added to a broken hole.

As illustrated in FIG. 11, the floor mat 100 may be damaged in another way so that an alternative repair method is needed. Such damage may result in a tear out 800. The tear out 800 exposes the honey-comb design internals or the beveled ridge walls 325 of the mat 100. The tear out 800 leaves an empty spacing in floor mat 100, which compromises the strength and allows for a weak point of further damage. Filler 810 may be applied to at least partially fill the tear out 800. Filler 810 may be beads or a similar material designed to fill or permeate an opening. Filler 810 also provides support for in the tear out 800 to add material strength and prevent the tear out 800 from being a weak point or flexing. The tear out 800 is fixed by cleaning the tear out 800 surface, adding filler 810, welding over the tear out 800, sealing it, and then cleaning the top of the welding.

Figure 12:
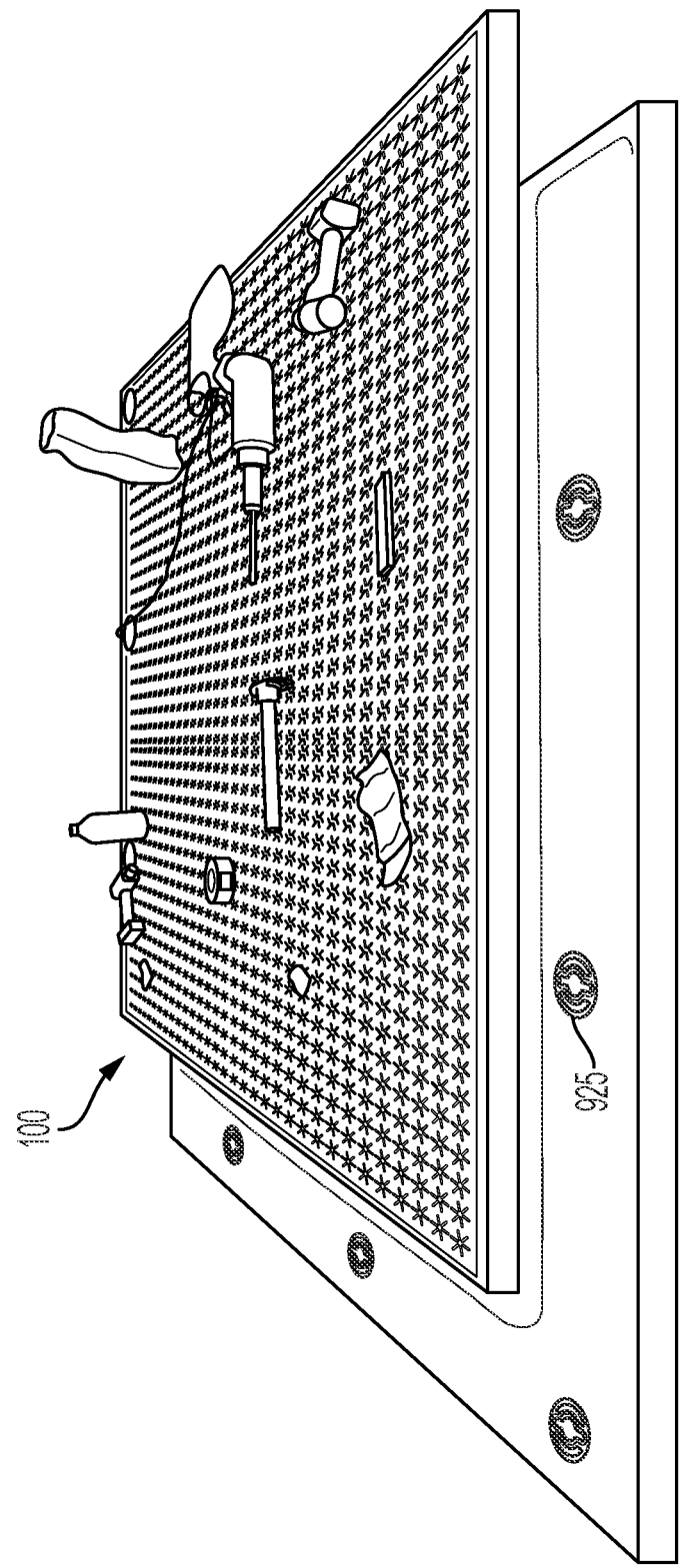
FIG. 12 is an isometric view of the flooring mat with the attachment device installed.
Figure 13:
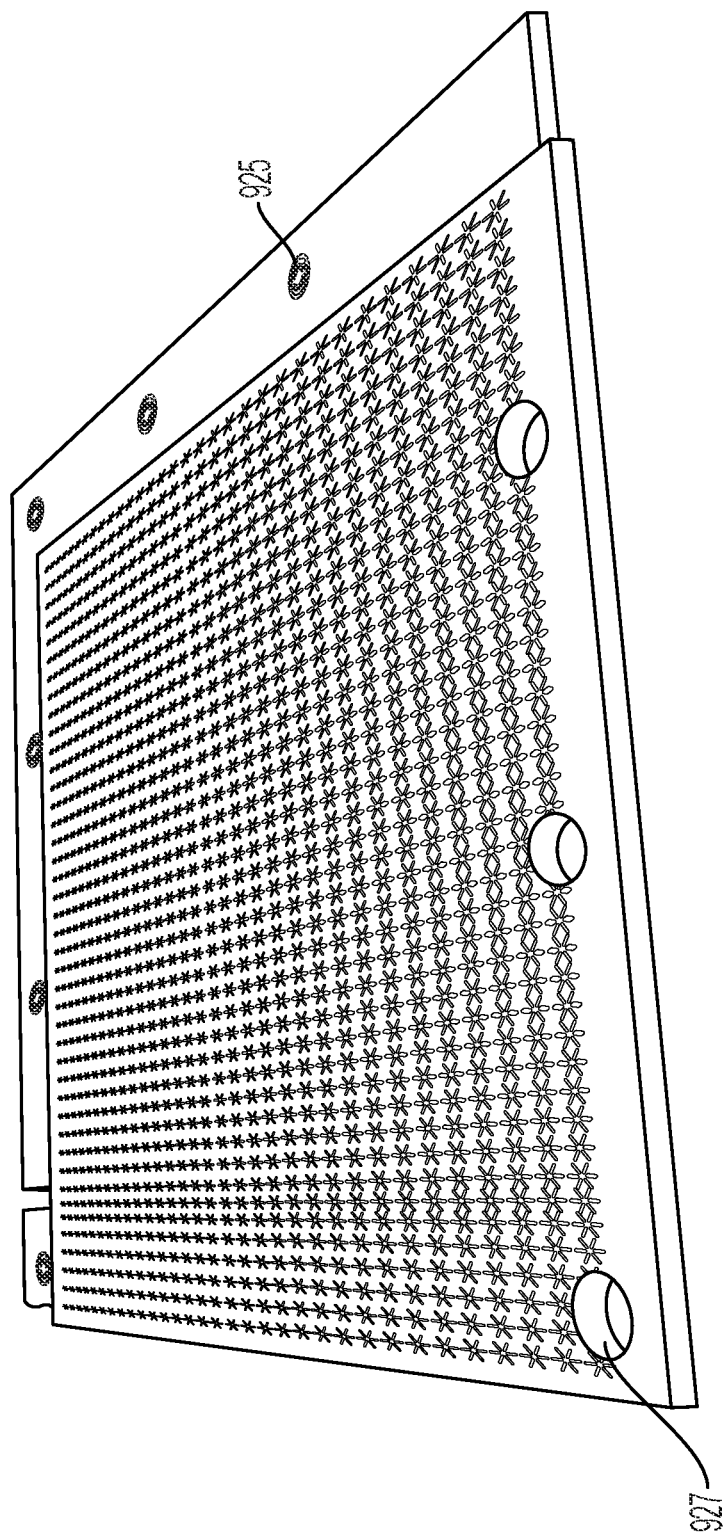
FIG. 13 is an isometric view of the flooring mat.
Figure 14:
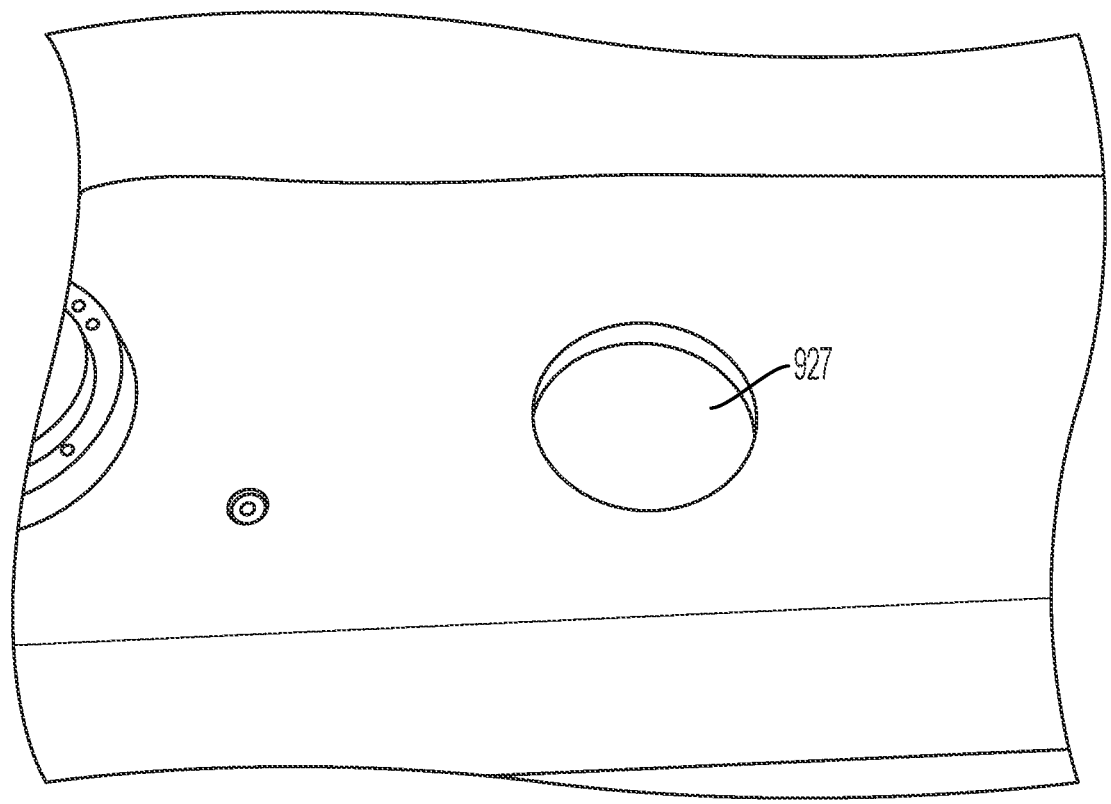
FIG. 14 is an isometric view of the flooring mat with holes.

Referring to FIGS. 12-14, the floor mat 100 is shown with lock devices 925 installed and with some of the holes 927 without the lock devices 925 installed. The holes 927 are at least large enough to fit the lock device 925. Holes 927 may go through the floor mat 100 fully, providing access to both the top surface 130 and bottom surface 140. The engagement aperture 150 is made up of at least the lock device 925 and a washer 900 which are placed within, or approximate, to the holes 927.

Figure 15:
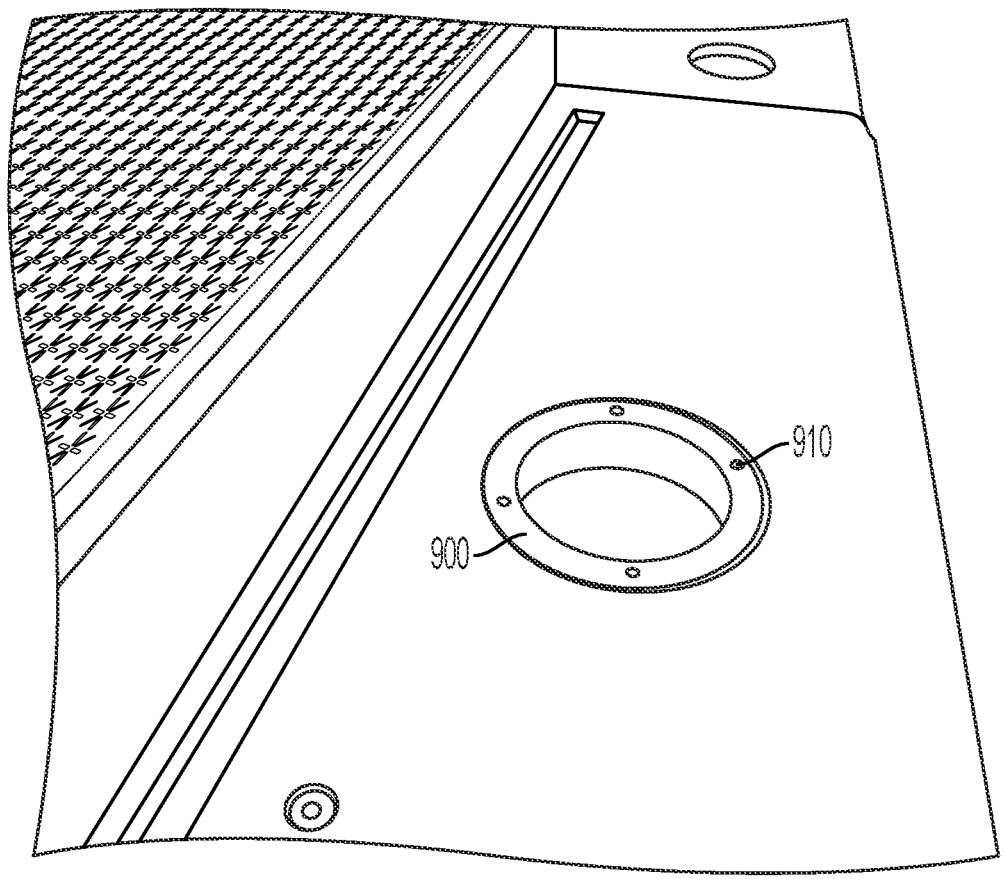
FIG. 15 is an angled view of the hole with a washer installed.
Figure 16:
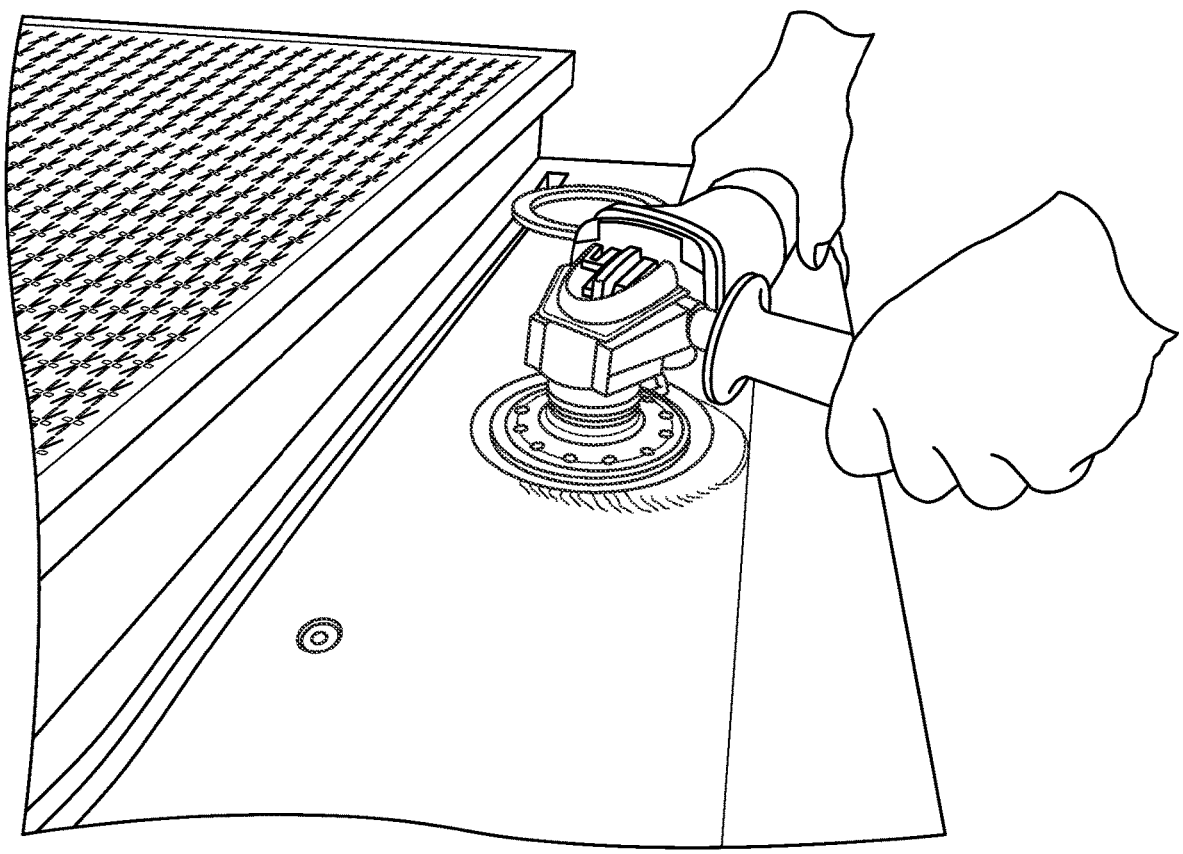
FIG. 16 is an angled view of the hole with the surrounding area being prepared.

Referring to FIGS. 15 and 16, the washer 900 is shown coupled to the top of hole 927. The top of holes 927 or the area surrounding holes 927 are countersunk to allow for the fitting of the washer 900. The washer 900 is placed in the countersunk area around the hole 927. The countersunk area around the hole 927 is at least deep enough to allow for the washer 900 to be even or flush with the area around the holes 927 of the floor mat 100. Preferably, the countersunk area around the hole 927 is deeper than the thickness of the washer 900 to allow for a margin of error or a future step of adding thermoplastic over the washer 900. The countersunk area around the holes 927 is formed with a grinding or digging device. The washer 900 may include attachment points 910. The attachment points 910 are spaced out along the washer 900 to provide at least a uniform connection when the washer 900 is attached via the attachment points 910. The washer 900 may be attached to the area round the holes 927 by bonding, securing with pins, or any other attachment means.

The lock devices 925 are releasably securable through corresponding holes 927. The lock devices 925 may have any suitable form, construction, or configuration. In a preferred embodiment, the lock devices 925 have a top section which extend through the corresponding hole 927 and bottom section with a larger diameter. In this embodiment, the illustrated floor mat 100 includes a plurality of lock devices 925, each configured to accept a releasable locking pin there-through. Each illustrated floor mat 100 may include, for example, a total of 16 locking devices 925. In some embodiments, the locking devices 925 may form a liquid-tight seal around, or in, the holes 927 within which they are engaged. Some examples of locking devices 925 may be circular or oval shaped, but are not limited to such shapes.

Figure 17:
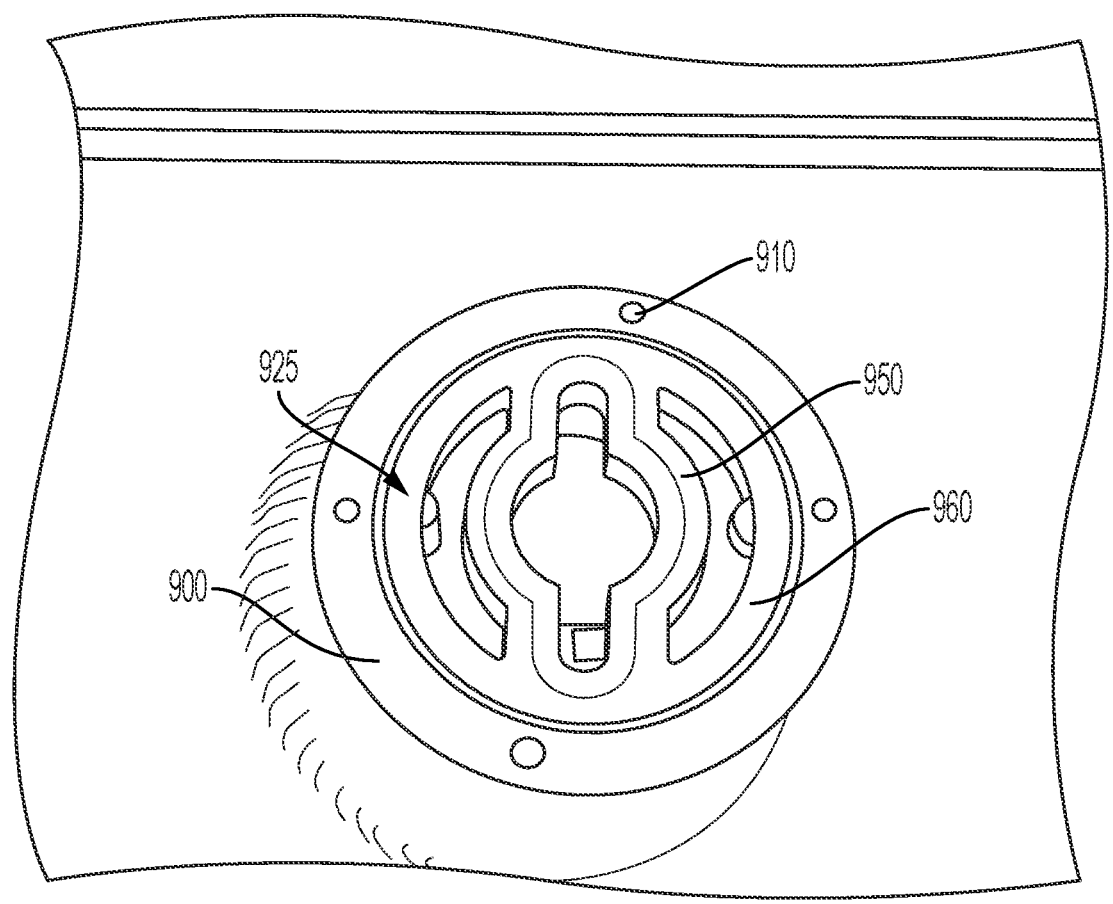
FIG. 17 is a top down view of the hole with the center piece installed.

Referring to FIG. 17, the locking device 925 is shown installed in the hole 927. The locking device 925 may include a lock frame 950 structured to engage and lock with a rotatable pin and a body 960 shaped to securely fit in the holes 927. The lock frame 950 may also have an attachment means or a section for installing attachment means. The locking device 925 may be installed into the hole 927 directionally from the bottom surface 140 of the floor mat 100 using a hammer or other means of force. Once the locking device 925 is installed securely in the hole 927, pins or another attachment means are installed or used to fix the locking device 925 to the floor mat 100 from the bottom surface 140. Preferably, the bottom section with a larger diameter is fixed to the area around the hole 927 using pins or another attachment means.

Once the locking device 925 and washer 900 are installed, both surround the area around the hole 927 from the top surface 130 and bottom surface 140 directions. Additional filing may be done to the washer 900 and locking device 925 to make all surfaces flush with the area surrounding the holes 927. The locking device 925 preferably does not extend past the top of the washer 900.

Figure 18:
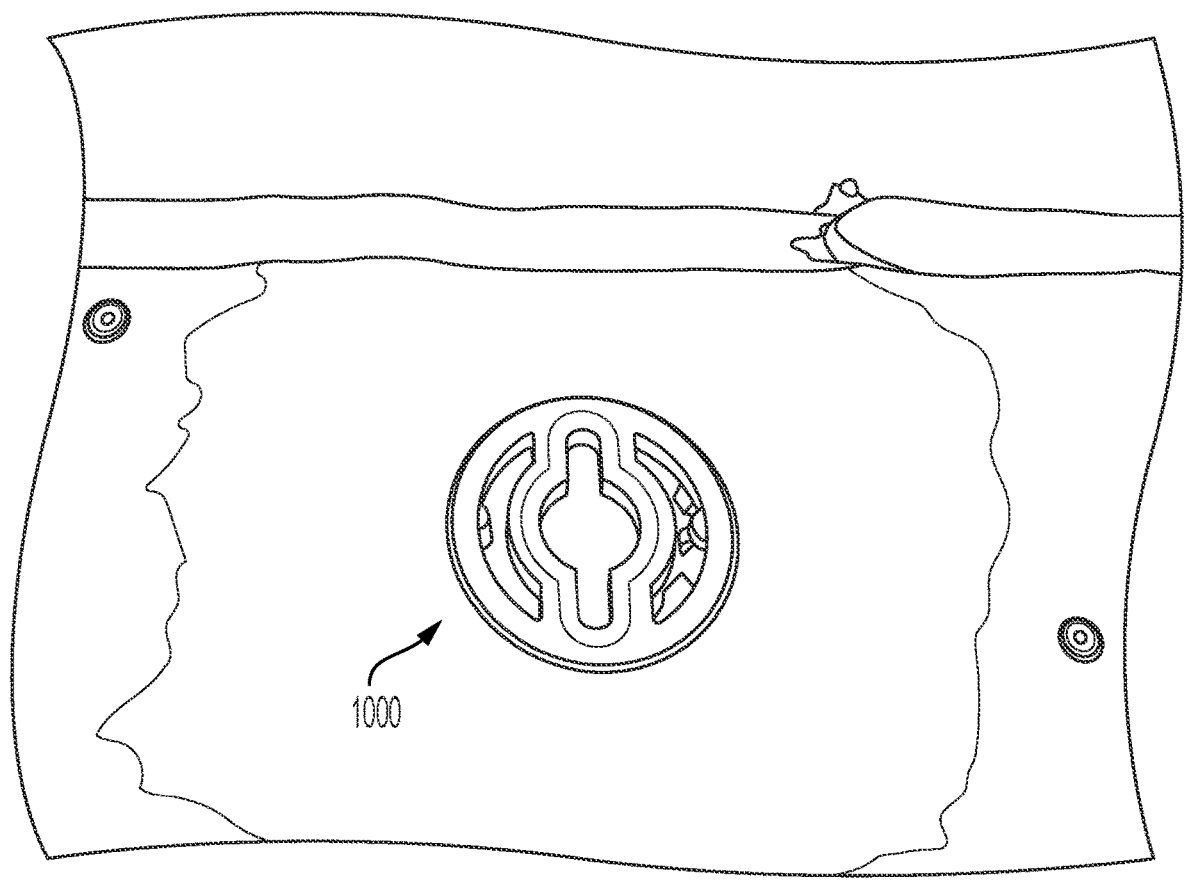
FIG. 18 is a top down view of the center piece installed with a bonding agent.
Figure 19:
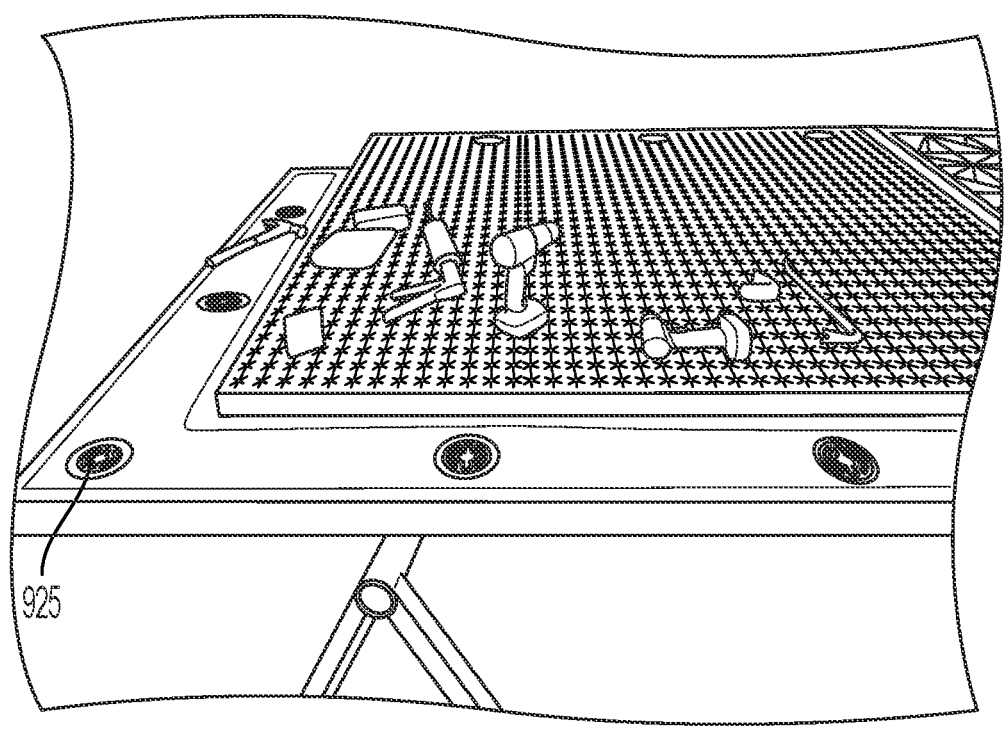
FIG. 19 is an isometric view of the flooring mat with the center piece installed.
Figure 20:
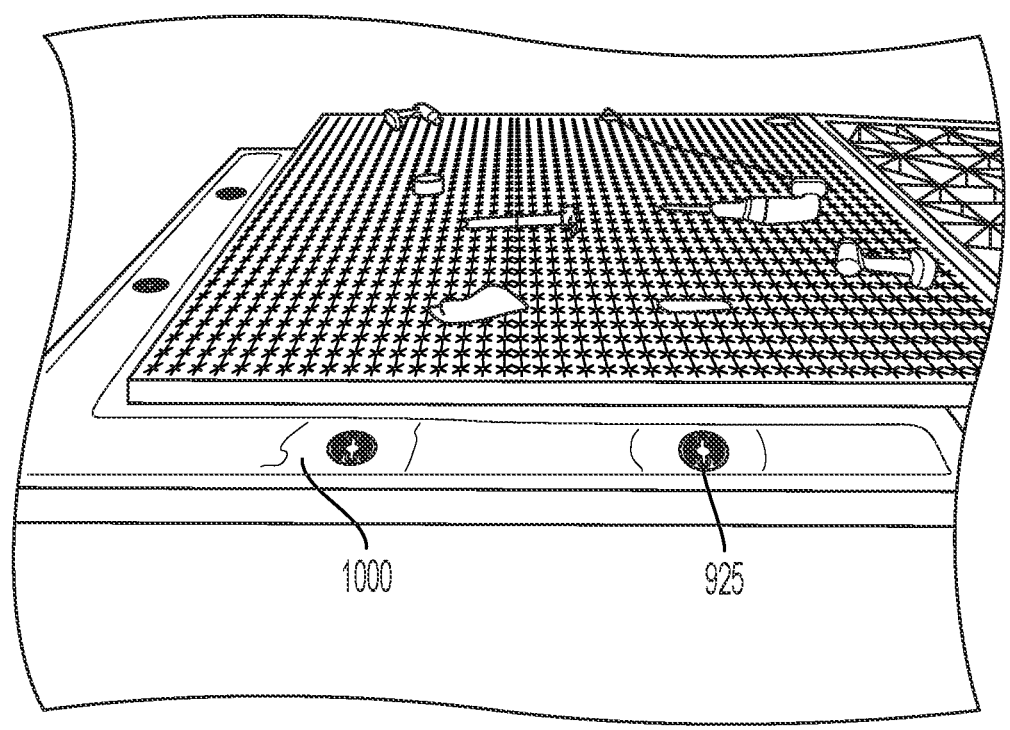
FIG. 20 is an isometric view of the flooring mat with the bonding agent applied.

Referring to FIGS. 18-20, a bonding agent 1000 is shown formed over the washer 900. The bonding agent 1000 may be formed over or around the washer 900 and area surrounding the holes 927. The bonding agent 1000 may be a polymer, plastic welding material, concrete epoxy, or any material capable of sealing. The bonding agent 1000 acts as a weld to hold the washer 900 in place to the top of the area around the hole 927. After the bonding agent 1000 is sufficiently dry, a step of grinding or sanding may be applied to make the surface flush again with the surrounding area of the floor mat 100. The flush surface aids in the attachment of one floor mat 100 to another by allowing even surfaces to be stacked on one another. The bonding agent 1000, when solidified, increases the strength of the connection between the installed locking device 925 and hole 927. The solidified bonding agent 1000 may fully cover the washer 900 adding the properties of the thermoplastic and adding an increased bond between the mat 100 and the locking device 925. This allows for an increased protection, where the mat 100 may be able to sustain an increased force to the area around the locking device 925 without damage occurring. The locking device 925 advantageously increases the durability of the floor mat 100 at the connection points.

Figure 21:
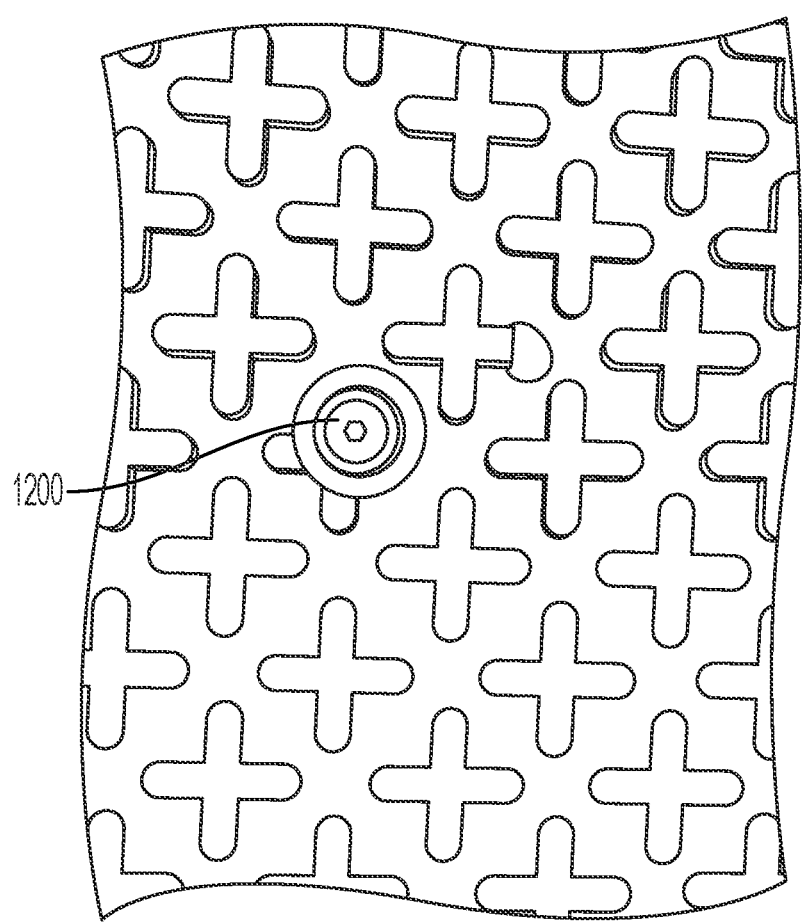
FIG. 21 is a top down view of the flooring mat with a bolt installed.
Figure 22:
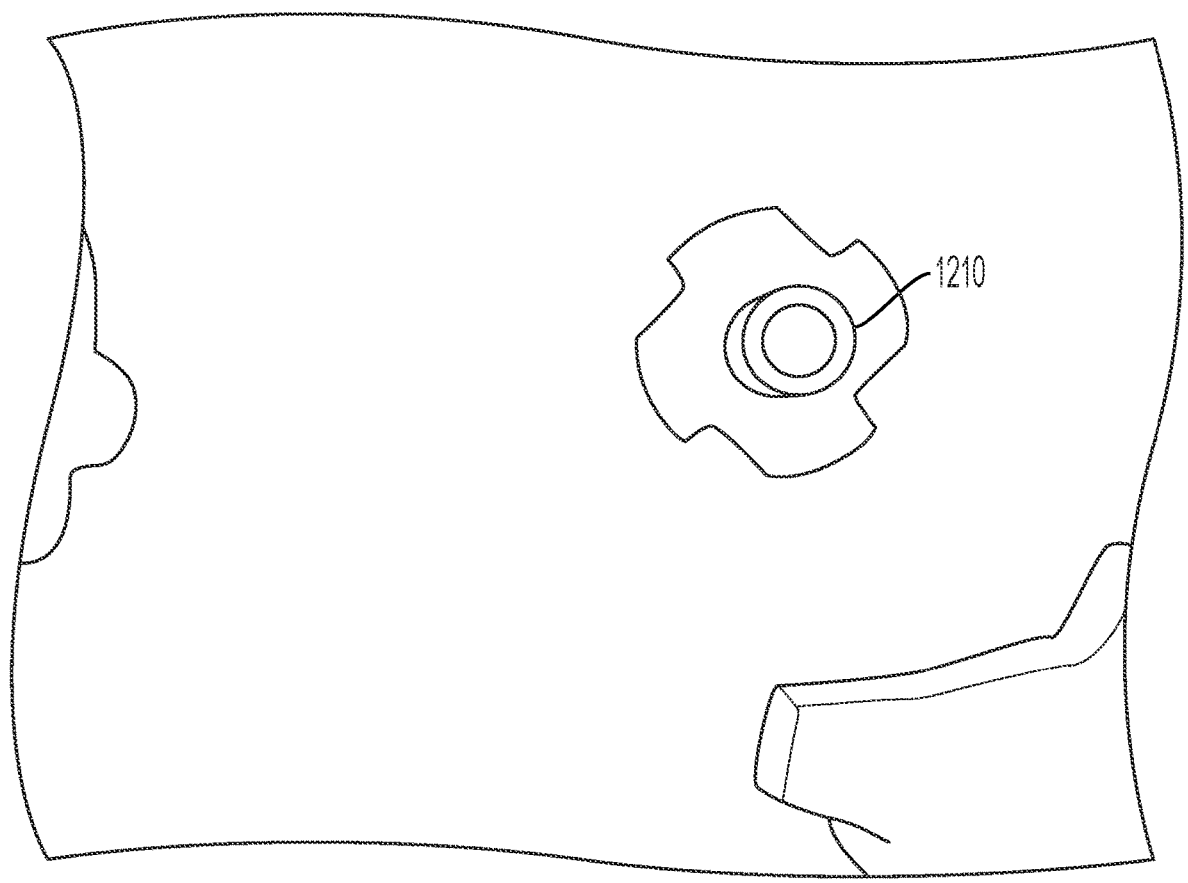
FIG. 22 is a top down view of the flooring mat with a nut fixed to the bolt.

Referring to FIGS. 21 and 22, a bolt 1200 is used to secure the top surface 130 to the main body 110 of the floor mat 100. The bolt 1200 extends through the main body 110 of the floor mat 100 and is exposed through the bottom surface 140. The bolt 1200 may extend from the bottom surface 140 to the top surface 130. The bolt 1200 is then fixed through the floor mat 100 and held in place by a nut 1210. The nut 1210 may be countersunk into the top surface 130 or bottom surface 140 of the floor mat 100. This is to keep the surface of the floor mat 100 uniform, as to provide a flush or even surface. The bonding agent 1000 may be applied here as well.

The invention claimed is:

1. A method of repairing a construction mat, comprising:
   cutting an irregular section of the construction mat to an approximately perpendicular edge;
   cutting a surface of an irregular open section of the construction mat to an approximately flat or square edge;
   drilling holes into a perpendicular aperture edge;
   applying a filler to the open section;
   applying a sealant to the perpendicular edge and approximately flat edge;

inserting bars into the holes of the perpendicular aperture edge;

drilling holes into a secondary aperture piece;

conjoining the secondary piece to the perpendicular edge, wherein the secondary piece covers the open section and the bars are inserted into the holes of the secondary aperture piece;

clamping the secondary piece to the perpendicular edge temporarily;

clamping the open section to the flat edge temporarily;

fixing the secondary piece to the perpendicular edge;

fixing the open section to the perpendicular edge such that the secondary piece covers the open section; and wherein the construction mat being configured to support the weight of people, vehicles and equipment thereupon and undergo movement relative to one or more other construction mats without disengaging from another, and the construction mats comprise at least four sides and an edge extending along each side, the first and second sides of each construction mat having a lower lip extending horizontally outwardly below the edge thereof and the third and fourth sides of each construction mat having an upper lip forming the edge thereof, the respective upper and lower lips of different mats being interconnectable with locking pins releasably securable through corresponding apertures formed therein and wherein the secondary piece is fixedly attached to the construction mat to repair the construction mat.

2. The method of repairing the construction mat according to claim 1, further comprising: clamping the secondary piece to the perpendicular edge via an engagement aperture.

3. The method of repairing the construction mat according to claim 1, further comprising: drilling the holes such that the hole tunnels through at least a minor portion of the construction mat.

4. The method of repairing the construction mat according to claim 1, further comprising: applying the sealant to the holes prior to inserting the bars.

5. The method of repairing the construction mat according to claim 1, further comprising applying the sealant to the filler, wherein the filler is a solid material.

6. The method of repairing the construction mat according to claim 1, further comprising applying the sealant to the filler, wherein the filler is a liquid material.

7. The method of repairing an attachment piece of the construction mat according to claim 1, further comprising:

preparing a locking center and a washer for installation;

preparing a hole to receive the locking center;

installing the locking center in the hole;

forming attachment points through the construction mat; and using pins through the attachment points to fixedly attach the locking center and washer to the construction mat;

wherein the construction mat being configured to support the weight of people, vehicles and equipment thereupon and undergo movement relative to one or more other construction mats without disengaging from another, and the construction mats comprise at least four sides and an edge extending along each side, the first and second sides of each construction mat having a lower lip extending horizontally outwardly below the edge thereof and the third and fourth sides of each construction mat having an upper lip forming the edge thereof, the respective upper and lower lips of different mats being interconnectable with locking pins releasably securable through corresponding apertures formed therein and wherein the secondary piece is fixedly attached to the mat to repair the construction mat.

8. The method of repairing the attachment piece of the construction mat according to claim 7, further comprising grinding the washer and pins to be flush with the mat.

9. The method of repairing the attachment piece of the construction mat according to claim 7, further comprising applying a plastic weld over the washer to seal over the washer.

10. The method of repairing the attachment piece of the construction mat according to claim 9, further comprising grinding the plastic weld to be flush with the construction mat.

11. The method of repairing the attachment piece of the construction mat according to claim 7, further comprising:

drilling a hole through a top surface of the construction mat; and inserting a fastener into the hole to secure the top surface to the bottom surface of the construction mat.

12. The method of repairing the attachment piece of the construction mat according to claim 7, further comprising relaseably securing the construction mat to a second mat through corresponding apertures formed therein.

13. The method of repairing the attachment piece of the construction mat according to claim 7, further comprising applying the plastic weld to the lower lip extending horizontally outwardly below the edge.

\* \* \* \* \*

UNITED STATES PATENT AND TRADEMARK OFFICE
CERTIFICATE OF CORRECTION

| | | |
|---|---|---|
| PATENT NO. | : 12,129,605 B2 | Page 1 of 1 |
| APPLICATION NO. | : 18/006179 | |
| DATED | : October 29, 2024 | |
| INVENTOR(S) | : Richard John Brennan | |

It is certified that error appears in the above-identified patent and that said Letters Patent is hereby corrected as shown below:

In the Claims

Column 12, Line 42, Claim 12, delete "relaseably" and insert -- releasably --

Signed and Sealed this
Twenty-eighth Day of January, 2025

Coke Morgan Stewart
*Acting Director of the United States Patent and Trademark Office*